United States Patent [19]

Haselmaker

[11] Patent Number: 4,544,383

[45] Date of Patent: Oct. 1, 1985

[54] HORIZONTAL FLOW ELECTROSTATIC PRECIPITATOR WITH GAS DISTRIBUTOR RECEIVING DOWNWARD GAS FLOW

[75] Inventor: Karl Haselmaker, Maintal, Fed. Rep. of Germany

[73] Assignee: Metallgesellschaft Aktiengesellschaft, Frankfurt, Fed. Rep. of Germany

[21] Appl. No.: 570,008

[22] Filed: Jan. 11, 1984

[30] Foreign Application Priority Data

Jan. 13, 1983 [DE] Fed. Rep. of Germany ....... 3300859

[51] Int. Cl.⁴ .......................... B03C 3/01; B03C 3/36
[52] U.S. Cl. ..................................... 55/129; 55/126; 55/418
[58] Field of Search ................. 55/125, 126, 128, 129, 55/344, 418; 137/544, 561 A, 627; 138/43–45

[56] References Cited

U.S. PATENT DOCUMENTS

| | | | |
|---|---|---|---|
| 1,953,082 | 4/1934 | Lawrence | 55/129 |
| 2,787,334 | 4/1957 | Linderoth | 55/128 |
| 4,227,903 | 10/1980 | Gustausson et al. | 55/418 |
| 4,283,205 | 8/1981 | Schumann | 55/128 |
| 4,286,974 | 9/1981 | Schminke et al. | 55/129 |
| 4,443,234 | 4/1984 | Carlsson | 55/126 |

FOREIGN PATENT DOCUMENTS

| | | | |
|---|---|---|---|
| 262460 | 3/1966 | Austria . | |
| 1085854 | 7/1960 | Fed. Rep. of Germany . | |
| 1005044 | 8/1961 | Fed. Rep. of Germany . | |
| 1256201 | 12/1967 | Fed. Rep. of Germany . | |
| 771244 | 3/1957 | United Kingdom | 55/128 |
| 922730 | 4/1963 | United Kingdom | 55/128 |
| 381396 | 9/1973 | U.S.S.R. | 55/129 |
| 440157 | 2/1975 | U.S.S.R. | 55/129 |

OTHER PUBLICATIONS

German Reference "Material-Exemplar", Metallgesellschaft, pp. 2–6, 1 Sheet of Drawing.

*Primary Examiner*—David L. Lacey
*Attorney, Agent, or Firm*—Karl F. Ross; Herbert Dubno

[57] ABSTRACT

A combination of a horizontal-flow electrostatic precipitator having a first inlet for a gas to be cleaned, the first inlet having a reactangular configuration lying substantially in a vertical plane and a diverting and distributing device for feeding vertically downwardly arriving gas to the first inlet, the device having a downwardly divergent diffuser provided with a second inlet for receiving the gas and being disposed adjacent the first inlet. A housing constructed to define a downwardly convergent inlet passageway connected to the diffuser receives the gas therefrom, the housing being open laterally in the direction of the first inlet and in flow communication therewith over the entire cross-section thereof, with structure forming a preliminary dust-accumulating bin below the housing and connected thereto. A partition within the housing is disposed in the passageway and is constructed and arranged to form two flow cross sections therein, subdividing the interior of the passageway into an upper flow cross-section open laterally over only an upper portion of the first inlet, and a flow cross-section around the upper cross section opening into the remainder of the first inlet, thereby compelling a portion of the gas to flow through the upper portion of the first inlet.

10 Claims, 4 Drawing Figures

HORIZONTAL FLOW ELECTROSTATIC PRECIPITATOR WITH GAS DISTRIBUTOR RECEIVING DOWNWARD GAS FLOW

FIELD OF THE INVENTION

My present invention relates to a distributor for a gas stream and, more particularly, to a distributor at the input side of a horizontal-flow electrostatic precipitator.

BACKGROUND OF THE INVENTION

Apparatus for diverting and uniformly distributing a vertically downwardly arriving gas stream is required at the entrance cross-section of a horizontal-flow dust-collecting electrostatic precipitator and for effecting a preliminary separation of dust. In such a distributor a flaring conical entrance fitting opens into devices which extend throughout the entrance cross-section of the dust-collecting unit and serve to divert and distribute the gas stream. A housing wall together with the diverting device encloses a downwardly tapering, wedge-shaped entrance passage A dust-accumulating bin is disposed at the bottom of the apparatus.

A distributor is needed when of the direction of flow of the gas stream must be changed from the vertical to the horizontal or when a flow in this latter direction is desirable because it reduces plant costs and pressure drops.

In such cases the diverting and distributing apparatus is generally used as a mechanical preliminary dust separator (see German Utility Model No. 18 64 332 and German Patent Specification No. 10 05 044), particularly if the dust content exceeds 100 grams per cubic meter. Such high dust contents are present when the dust itself is the product of a process, e.g. in the production of cement and the calcination of alumina, rather than dust produced merely as an undesired by-product, e.g., in the operation of power plant boilers or steelmaking converters.

When a gas having a high dust content arrives from above, particularly great difficulties are involved in the deflection of the gas stream through 90° into a horizontal flow and in the uniform distribution of the gas stream over the entrance cross-section of a horizontal-flow dust-collecting unit.

Centrifugal forces and gravitation act in the same sense on the dust particles and tend to segregate them and cause them to become enriched in that portion of the gas stream which flows through the lower portion of the dust-collecting unit.

Also in other applications and for other reasons, the distribution of dust over the flow area of the dust-collecting unit has a strong detrimental effect on the dust-removal capacity because the operation of the dust-collecting unit cannot even approximately be optimized. The much larger quantity of dust collected on the lower portions of the collecting electrodes must be taken into account in the selection of the frequency of the rapping blows performed to clean the electrodes and imposes also an upper limit for the operating voltage.

On the other hand, much less dust is collected on the upper portion of the collecting electrodes and for this reason a different rapping frequency and operating voltage are required for such upper portion. The more divergent the gas flows, the greater is the variation of the quantities of dust collected on the collecting electrodes over the height thereof.

Particularly, the quantities of dust which are released the rapping blows cannot be maximized because this would require an optimum rapping frequency and such optimum rapping frequency cannot be used unless dust is collected with reasonable uniformity over the entire area of the collecting electrodes. If the collection of dust varies greatly over the height of the collecting electrodes, a rapping frequency corresponding to the average dust-collecting rate will be too high in the upper portion and too low in the lower portion.

Additional problems arising in this kind of apparatus are due to an uncontrolled deposition of dust (see German Patent Specification No. 10 05 044). Such deposits of dust may adversely affect the flow of the gas stream and give rise to a need for a removal of the dust. It will be understood that these problems will also be more serious as the dust content of the gas stream increases.

OBJECTS OF THE INVENTION

For this reason, it is therefore an object of the present invention to provide an improved diverting and distributing apparatus for the purposes set forth, so the disadvantages described hereinbefore are obviated.

Another object is to provide an improved diverter wherein the gas stream can be diverted in a satisfactory manner with a low loss and can be distributed as uniformly as possible over the entire cross section of the dust-collecting unit as far as the velocity of flow and the dust content are concerned.

Yet another object is to provide such an apparatus wherein the dust which has been removed from the gas stream by the preliminary separation should be accumulated and discharged in a satisfactory manner.

SUMMARY OF THE INVENTION

In an apparatus of the type described hereinabove, these objects are achieved in that a partition is provided by which the tapering wedge-shaped entrance passage is divided in such a manner that one part of the gas stream is compelled to flow through the upper portion of the entrance cross section. The partition suitably encloses a wedge-shaped upper entrance passage, which tapers downwardly and is downwardly constricted, preferably in a funnel shape, transversely to the wedgelike taper.

According to a feature of the invention, the upper entrance passage opens at its lower end in a tubular dust chute, which extends into the dust-accumulating bin. The diverting device consists preferably of hinged plates or louver blades, which can be of any conventional pivotal baffle-plate design.

Perforated plates or perforated hinged plates have proved satisfactory as means for effecting a uniform distribution of the gas stream.

For a subsequent change of the division of the gas stream the entrance edge of the partition is preferably pivotally movable at least over a part of its length in a direction which is transverse to the direction of flow of the gas, or a hinged plate which is pivotally movable transversely to the direction of flow of the gas is provided on the stationary entrance edge of the partition.

The problems described hereinbefore will be substantially avoided because the gas stream in the entrance passage is divided and one part of the gas stream is compelled to flow through the upper portion of the entrance cross-section. Owing to the diversion of a vertical partition, the dust-collecting unit will have the cross section as regards velocity of flow and dust content if the partition in the entrance passage is properly disposed. For instance, the incoming gas stream can be divided into two parts having the same flow rate. Alternatively the partition may be arranged to divide the gas stream into partial streams which differ in flow rate.

Within the scope of the invention, more than one partition may be provided so that the gas stream is divided into more than two parts. In another alternative, those portions of the entrance cross-section which are associated with respective gas streams do not correspond to the flow rates of the partial gas streams so that the partial gas streams entering the dust-collecting unit flow at more or less greatly differing velocities. This may be desirable for a mode of operation which is optimized as regards a uniform collection of dust on the areas of the collecting electrodes throughout the height thereof.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
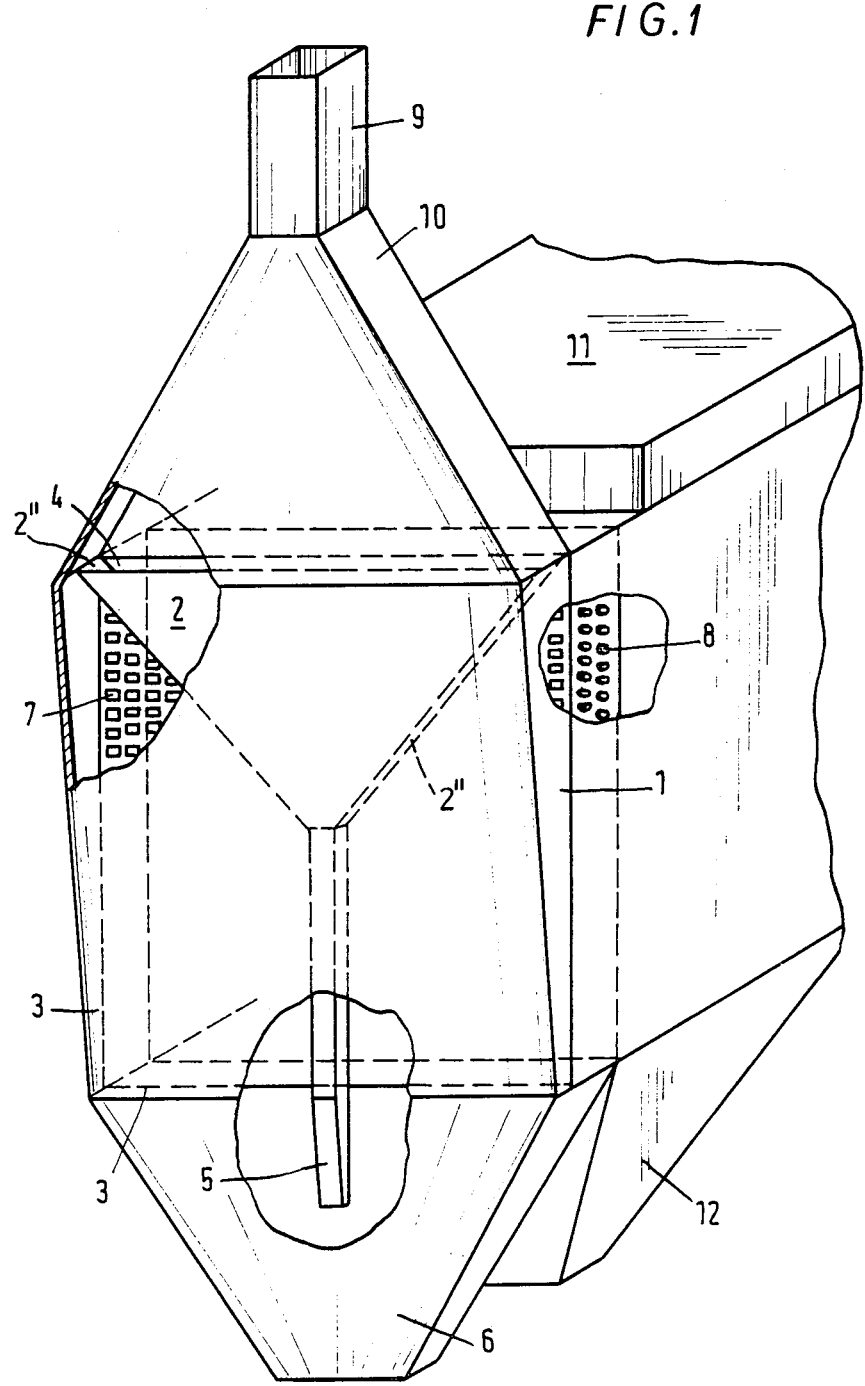
FIG. 1 is a perspective view, partly broken away, illustrating the inlet side of an electrostatic precipitator provided with a diverter and distributor according to the invention.

FIG. 1 shows a housing 11 of a dust-collecting unit, through which the gas flows in a horizontal direction. A dust-accumulating bin 12 is connected to the bottom of the housing 11.

With respect to the direction of flow, the dust-collecting unit is preceded by apparatus for diverting and uniformly distributing the incoming gas stream. That gas stream arrives through the duct 9 and the diffuser 10 and is conducted into the downwardly tapering, wedge-shaped entrance passage 1.

The downstream boundary of the entrance passage 1 is constituted by a diverting device 7, which may consist of a hinged or baffle-flap plate.

Figure 4:
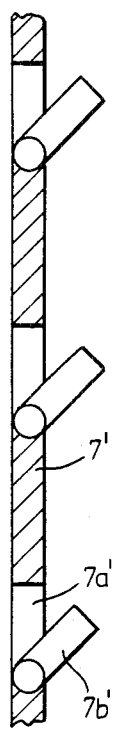
FIG. 4 is a section drawn to an enlarged scale of a perforated plate according to another embodiment of the invention.

The diverting device 7 is referred to herein as a baffle plate because it consists of a plate formed with openings 7a which are in part defined by upwardly and inwardly directed flaps 7b which assist in distributing the flow substantially uniformly. This plate can also be hinged to vary its orientation to the vertical and/or formed as a jalousie so that the flow distribution can be controlled. Thus hinged flaps 7b' can be provided to control openings 7a' on the plate 7' (FIG. 4).

A device for uniformly distributing the gas stream is provided, which is spaced apart from the diverting device 7 and consists of a perforated plate 8. The plate 7 and also the perforated plate 8 extend throughout the entrance section 3 of the dust-collecting unit. Another dust-accumulating bin 6 is provided under the entrance passage 1. The entrance passage 1 is divided by a partition 2 having flanges 2'', which defines an upper entrance passage 4, which is also wedge-shaped and tapers downwardly and which is conically constricted in a direction which is transverse to the direction of the wedgelike taper. The upper entrance passage 4 opens at its lower end into a tubular dust chute 5, which extends into the dust-accumulating bin 6.

Figure 2:
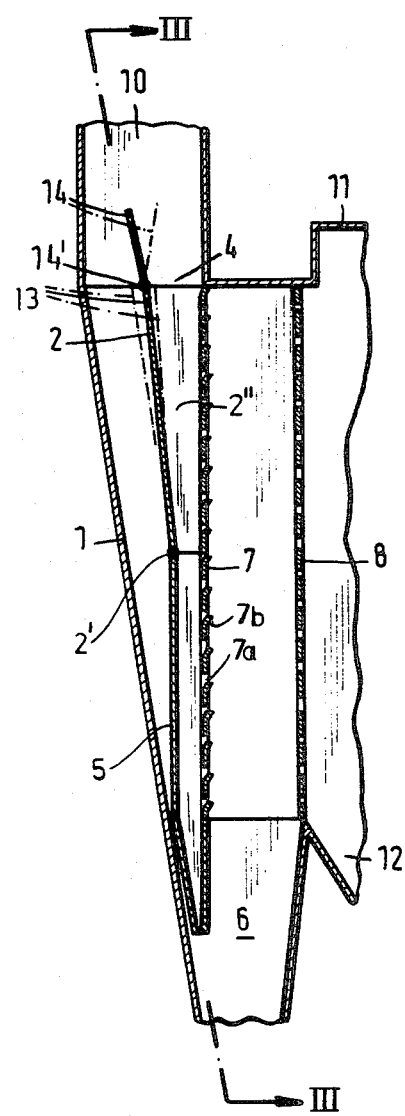
FIG. 2 is a diagrammatic cross sectional view taken in a vertical plane in the direction of flow through the precipitator and corresponding to line II—II of FIG. 3.
Figure 3:
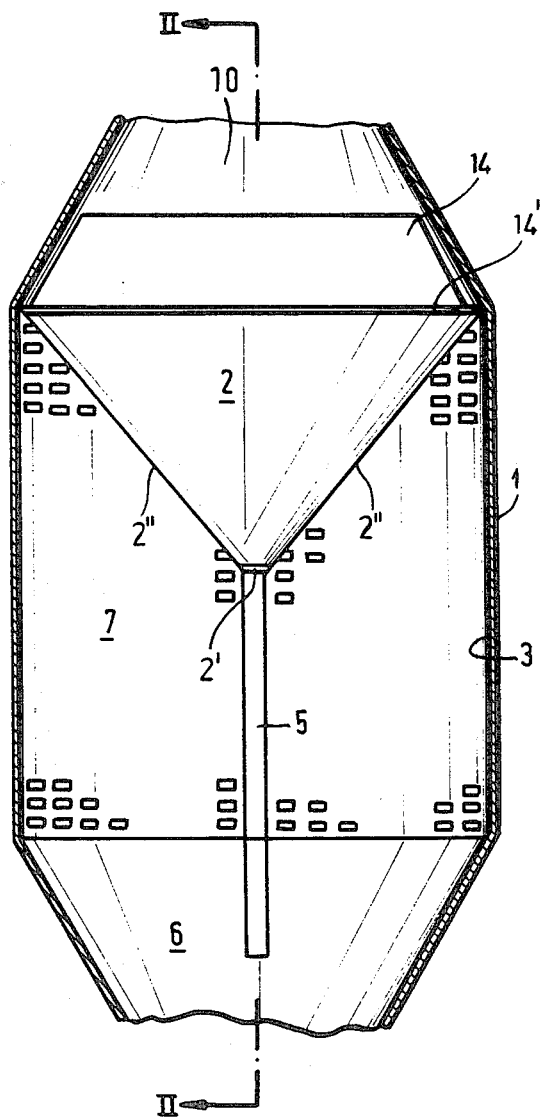
FIG. 3 is a vertical section taken substantially along the line III—III of FIG. 2 and approximately perpendicular to the direction of the section of FIG. 2.

FIGS. 2 and 3 also show the diverting device 7 and the partition 2. From FIG. 2 it is apparent how the entrance passage 1 is divided by the partition 2, which defines an upper entrance passage 4.

In the embodiment shown by way of example, the partition 2 is arranged in such a manner that the arriving gas stream is divided into two gas streams having equal flow rates. This is not intended to mean that the illustrated division of the gas stream and of the entrance cross section will result in an optimum dedusting capacity. On the contrary, it is intended to make clear that a variation is possible in this respect. In each case, the optimum ratios will have to be determined by calculations and/or experiments. In many cases there will be asymmetries in the incoming gas stream and such asymmetries should be taken into account and can be compensated by means of the apparatus according to the invention. In FIGS. 2 and 3 the reference numerals have the same meanings as in FIG. 1.

If the optimum division of the gas stream cannot be calculated and can be determined by experiments only at an unreasonably high expenditure, the partition 2 will desirably be provided with an entrance edge 13 which is pivotally movable transversely to the direction of flow of the gas, as is indicated by dotted lines in FIG. 2. As an alternative or in addition thereto, a hinged plate 14 can be mounted on the stationary entrance edge 13. Both measures will also be of advantage if a subsequent change of the division of the gas stream may become necessary.

As can be seen from FIGS. 2 and 3, the hinged plate 14 can be a plate which reaches into the diffuser 10 and is connected by a hinge 14' disposed along the entrance edge 13 of the partition 2. This hinge can be of the high-friction type so that the position of the plate 14 with respect to the partition 2 can be set upon assembly to obtain the desired flow distribution between the flow into the passage 4 and into the balance of the entrance section 3, or the plate 14 can be actuated by means of a handle connected to the hinge pin and traversing a slot in the housing wall to enable adjustment of this plate much as an adjustable baffle is utilized to distribute flow in duct work generally.

Similarly, the partition 2 can be connected by a pivot 2' to the duct 5 so as to enable its adjustment to vary the angle which it includes with the baffle plate 7.

I claim:

1. A combination of a horizontal-flow electrostatic precipitator having a first inlet for a gas to be cleaned of rectangular configuration lying substantially in vertical plane and a diverting and distributing device for feeding vertically downwardly arriving gas to said first inlet, said device comprising:

a downwardly divergent diffuser having a second inlet for receiving said gas and disposed adjacent said first inlet;

a housing constructed to define a downwardly convergent inlet passageway connected to said diffuser and receiving said gas therefrom, said housing being open laterally in the direction of said first inlet and in flow communication therewith over the entire cross-section thereof;

means forming a preliminary dust-accumulating bin below said housing and connected thereto; and a partition within said housing and in said passageway constructed and arranged to from two flow cross sections subdividing the interior thereof into an upper flow cross section open laterally over only an upper portion of said first inlet, and a flow cross-section around said upper cross section opening into the remainder of said first inlet, thereby compelling a portion of the gas to flow through the upper portion of said first inlet.

2. The combination defined in claim 1 wherein said partition is constructed and arranged so that said upper flow cross section tapers downwardly and converges toward said first inlet whereby said upper flow cross section has a wedge-shaped configuration.

3. The combination defined in claim 2 wherein said partition is constructed and arranged so that said upper flow cross section is conically constricted in a downward direction transverse to the taper thereof.

4. The combination defined in claim 1, further comprising a tubular dust chute connected to said partition and extending from a lower end of said upper flow cross section into said bin.

5. The combination defined in claim 1, further comprising between said flow cross section of said inlet passageway and said first inlet at least one diverting plate juxtaposed with said partition and partition and formed with a substantially uniform array of openings to effect uniform distributions of said gas from said second inlet to said first inlet.

6. The combination defined in claim 5 wherein said plate is provided with hinged flaps positioned and arranged with respect to said openings so as to control the gas flow therethrough.

7. The combination defined in claim 5, further comprising means for swingably mounting said partition on said housing for controlling the distribution of flow between said cross sections.

8. The combination defined in claim 1, further comprising means for swingably mounting said partition on said housing for controlling the distribution of flow between said cross sections.

9. The combination defined in claim 8, further comprising a hinged plate on an upper edge of said partition for pivotal movement transverse to the direction of flow of the gas for controlling distribution of flow between said cross sections.

10. The combination defined in claim 1, further comprising a hinged plate on an upper edge of said partition for pivotal movement transverse to the direction of flow of the gas for controlling distribution of flow between said cross sections.

* * * * *